US012598491B2

(12) United States Patent　　　　(10) Patent No.:　US 12,598,491 B2
Pantelidou et al.　　　　　　　　　　(45) Date of Patent:　　　Apr. 7, 2026

(54) PREDICTION IN A DISTRIBUTED NETWORK

(71) Applicant: Nokia Technologies Oy, Espoo (FI)

(72) Inventors: Anna Pantelidou, Massy (FR); Hakon Helmers, Massy (FR)

(73) Assignee: NOKIA TECHNOLOGIES OY, Espoo (FI)

( * ) Notice: Subject to any disclaimer, the term of this patent is extended or adjusted under 35 U.S.C. 154(b) by 314 days.

(21) Appl. No.: 18/262,135

(22) PCT Filed: Jan. 22, 2021

(86) PCT No.: PCT/EP2021/051524
§ 371 (c)(1),
(2) Date: Jul. 19, 2023

(87) PCT Pub. No.: WO2022/156906
PCT Pub. Date: Jul. 28, 2022

(65) Prior Publication Data
US 2024/0098586 A1　　Mar. 21, 2024

(51) Int. Cl.
*H04W 24/08*　　　　(2009.01)
(52) U.S. Cl.
CPC .................................. *H04W 24/08* (2013.01)
(58) Field of Classification Search
CPC ...... H04W 24/08; H04W 92/20; H04W 24/04
See application file for complete search history.

(56) References Cited

U.S. PATENT DOCUMENTS

| | | | | |
|---|---|---|---|---|
| 8,498,817 B1 * | 7/2013 | Erdmann | ............. | G06Q 10/083 |
| | | | | 705/333 |
| 11,678,208 B2 * | 6/2023 | Nainar | .................. | H04W 88/08 |
| | | | | 370/216 |
| 2014/0056165 A1 * | 2/2014 | Siomina | ................ | H04W 24/08 |
| | | | | 370/252 |
| 2014/0119188 A1 * | 5/2014 | Geijer Lundin | .. | H04W 52/0203 |
| | | | | 370/235 |
| 2016/0037541 A1 * | 2/2016 | Kim | ..................... | H04B 7/0626 |
| | | | | 370/329 |
| 2017/0325138 A1 * | 11/2017 | da Silva | .............. | H04W 36/302 |
| 2018/0046926 A1 * | 2/2018 | Achin | ................... | G06F 9/5011 |

(Continued)

FOREIGN PATENT DOCUMENTS

| | | |
|---|---|---|
| WO | 2020/060332 A1 | 3/2020 |
| WO | 2020/080989 A1 | 4/2020 |

OTHER PUBLICATIONS

"3rd Generation Partnership Project; Technical Specification Group RAN; Evolved Universal Terrestrial Radio Access (E-UTRA) and NR; Study on enhancement for Data Collection for NR and EN-DC (Release 17)", 3GPP TR 37.817, V0.0.0, Nov. 2020, 8 pages.

(Continued)

*Primary Examiner* — Ivan O Latorre
(74) *Attorney, Agent, or Firm* — Carter, DeLuca & Farrell LLP

(57) ABSTRACT

A communications network comprising network nodes (20), one network node being configured to generate a requests (200) requesting predicted data from at least one other network node. An other network node being configured in response to receiving a request for predicted data, to generate the predicted data and to transmit (220) the predicted data to the requesting network node.

1 Claim, 5 Drawing Sheets

(56) References Cited

U.S. PATENT DOCUMENTS

| | | | | |
|---|---|---|---|---|
| 2019/0319868 | A1 | 10/2019 | Svennebring et al. | |
| 2020/0092366 | A1* | 3/2020 | Fix | H04W 40/18 |
| 2020/0205062 | A1 | 6/2020 | Azizi et al. | |
| 2020/0259575 | A1* | 8/2020 | Bai | H04B 7/0862 |
| 2020/0260324 | A1 | 8/2020 | Byun et al. | |
| 2020/0260333 | A1* | 8/2020 | Kousaridas | H04W 4/40 |
| 2020/0275313 | A1 | 8/2020 | He et al. | |
| 2020/0413316 | A1* | 12/2020 | Isaksson | H04W 36/362 |
| 2021/0241177 | A1* | 8/2021 | Wang | G06N 5/04 |
| 2022/0101270 | A1* | 3/2022 | Tenneti | G06F 11/0751 |
| 2022/0110007 | A1* | 4/2022 | Kadadi | H04W 24/08 |
| 2022/0345911 | A1* | 10/2022 | Makki | H04W 24/02 |
| 2023/0300654 | A1* | 9/2023 | Da Silva | H04W 36/0085 |
| | | | | 370/242 |
| 2023/0308199 | A1* | 9/2023 | Svennebring | H04B 17/3913 |
| 2023/0345271 | A1* | 10/2023 | Veijalainen | H04W 24/10 |
| 2023/0370181 | A1* | 11/2023 | Rydén | H04B 17/336 |
| 2023/0403606 | A1* | 12/2023 | Lunardi | H04W 24/02 |
| 2024/0098586 | A1* | 3/2024 | Pantelidou | H04W 24/04 |
| 2024/0107410 | A1* | 3/2024 | Filin | H04W 52/0206 |
| 2024/0155377 | A1* | 5/2024 | Pantelidou | H04L 41/147 |
| 2024/0196272 | A1* | 6/2024 | Bruhn | H04W 28/0236 |
| 2024/0205875 | A1* | 6/2024 | Wang | H04W 36/249 |
| 2024/0236208 | A1* | 7/2024 | Bega | H04L 41/147 |
| 2024/0244499 | A1* | 7/2024 | Ramachandra | H04W 8/08 |
| 2025/0175856 | A1* | 5/2025 | Filin | H04W 24/02 |

OTHER PUBLICATIONS

"3rd Generation Partnership Project; Technical Specification Group Radio Access Network; NG-RAN; Xn application protocol (XnAP) (Release 16)", 3GPP TS 38.423, V16.3.0, Sep. 2020, pp. 1-451.

"3rd Generation Partnership Project; Technical Specification Group Radio Access Network; NG-RAN; F1 application protocol (F1AP) (Release 16)", 3GPP TS 38.473, V16.3.1, Oct. 2020, pp. 1-455.

"Revised SID: Study on enhancement for data collection for NR and Endc", 3GPP TSG RAN Meeting #89e, RP-201620, Agenda: 9.7.13, CMCC, Sep. 14-18, 2020, 4 pages.

"AI/ML based Use Cases", 3GPP TSG-RAN WG3 Meeting #110-e, R3-206437, Agenda: 18.3, Ericsson, Nov. 2-12, 2020, 15 pages.

"3rd Generation Partnership Project; Technical Specification Group Radio Access Network; W1 interface; Application Protocol (W1AP) (Release 16)", 3GPP TS 37.473, V16.3.0, Sep. 2020, pp. 1-143.

"3rd Generation Partnership Project; Technical Specification Group Radio Access Network; NR; NR and NG-RAN Overall Description; Stage 2 (Release 16)", 3GPP TS 38.300, V16.4.0, Dec. 2020, pp. 1-149.

"3rd Generation Partnership Project; Technical Specification Group Radio Access Network; Evolved Universal Terrestrial Radio Access (E-UTRA) and NR; Multi-connectivity; Stage 2 (Release 16)", 3GPP TS 37.340, V16.4.0, Dec. 2020, pp. 1-84.

"3rd Generation Partnership Project; Technical Specification Group Radio Access Network; NG-RAN; Architecture description (Release 16)", 3GPP TS 38.401, V16.4.0, Jan. 2021, pp. 1-78.

"3rd Generation Partnership Project; Technical Specification Group Radio Access Network; Universal Terrestrial Radio Access (UTRA), Evolved Universal Terrestrial Radio Access (E-UTRA) and Next Generation Radio Access; Radio measurement collection for Minimization of Drive Tests (MDT); Overall description; Stage 2 (Release 16)", 3GPP TS 37.320, V16.3.0, Dec. 2020, pp. 1-35.

International Search Report and Written Opinion received for corresponding Patent Cooperation Treaty Application No. PCT/EP2021/051524, dated Oct. 22, 2021, 18 pages.

Sun et al., "Draft new Supplement 55 to 1-5, ITU-T Y.3170-series(former ITU-T 7-15, Y.ML-IMT2020-Use-Cases): "Machine 17-19, leaming in future networks including 21-30, IMT-2020: use cases" for approval", Editors, SG13-TD224/PLEN, Oct. 14-25, 2019, pp. 1-60.

"3rd Generation Partnership Project; Technical Specification Group Services and System Aspects; Management and orchestration; Study on enhancement of Management Data Analytics (MDA) (Release 17)", 3GPP TR 28.809, V1.1.0, Nov. 2020, pp. 1-93.

"O-RAN Working Group 2 AI/ML workflow description and requirements", O-RAN Alliance, 0-RAN.WG2.AIML-v01.01. 2020, pp. 1-47.

"(TP for TR 37.817): Standards Impacts for the AV/ML Load Balancing Use Case", 3GPP#113-e, R3-213893, Agenda: 18.4, Nokia, Aug. 16-26, 2021, 4 pages.

* cited by examiner

PREDICTION IN A DISTRIBUTED NETWORK

RELATED APPLICATION

This application was originally filed as PCT Application No. PCT/EP2021/051524 on 22 Jan. 2021, which is incorporated herein by reference in its entirety.

TECHNOLOGICAL FIELD

Various example embodiments relate to the use of predicted data within a distributed network

BACKGROUND

Prediction is increasingly used within networks as a method to improve performance. For example, prediction of UE trajectory or future location can be useful to adjust handover (HO) thresholds or to select the RNA in RRC-INACTIVE or to optimise beamforming. Prediction of UE location could further help network resource allocation for various use cases including energy saving, load balancing and mobility management. As another example, HO decisions can be improved by using prediction information on the UE performance at the target cell. Energy saving decisions taken locally at a cell could be improved by utilizing prediction information on incoming UE traffic, as well as prediction information about traffic that may be offloaded from a candidate energy saving cell to a neighbour cell ensuring coverage. With increased computing power and artificial intelligence and machine learning the use of predicted data is becoming ever more important in improving the performance of devices within a network such as a wireless communication network.

Communication networks may be developed as distributed systems with peer to peer communication as opposed to having a centralised control mode. This works well for a multi-vendor system, however, where predicted data is used to improve performance within the network, then improving the performance of a device where its performance is affected by other devices within the network may be problematic.

BRIEF SUMMARY

The scope of protection sought for various embodiments of the invention is set out by the independent claims. The embodiments and features, if any, described in this specification that do not fall under the scope of the independent claims are to be interpreted as examples useful for understanding various embodiments of the invention.

According to various, but not necessarily all, embodiments of the invention there is provided according to a first aspect a network node having means configured to generate a request requesting predicted data from at least one other network node.

In some example embodiments, said network node may further comprise a means for transmitting said request towards at least one further network node.

In some example embodiments, said request may comprise an indication of said at least one other network node that a prediction for generating said predicted data should be performed at.

In some example embodiments, the at least one other network node is the at least one further network node that the request is transmitted to.

In some example embodiments, said request comprises an indication of a trigger for triggering a prediction for generating said predicted data to be performed.

In some example embodiments, said trigger comprises at least one of: a time period within which said prediction should be performed; a plurality of time periods within which a plurality of said predictions should be performed; and at least one event for triggering said prediction.

In some example embodiments, said request comprises an indication of a level of confidence that said predicted data should satisfy.

In some example embodiments, the network node may further comprise: means for determining at least one operational parameter of said network, said means for determining being configured to ascertain data required for said determining and in response to said data being predicted data obtainable at at least one other network node, said means for determining is configured to trigger said means configured to generate said request to generate said request for said predicted data.

In some example embodiments, said means for determining may comprise prediction means for predicting at least one operational parameter of said network.

In some example embodiments, said prediction means may comprise a processor configured to execute a machine learning model, said at least one predicted operational parameter being generated by said machine learning model in dependence upon received predicted data.

In some example embodiments, said network node comprises receiving means for receiving predicted data requested by said request.

In some example embodiments, said network node comprises receiving means for receiving requests for predicted data from other network nodes.

In some example embodiments, said network node is configured, in response to receipt of a request for predicted data from an other requesting network node, to request activation of said prediction means to generate said predicted data.

In some example embodiments, said network node is further configured following activation of said prediction means to generate a response to said other requesting network node indicating a prediction has commenced.

In some embodiments, the response includes an indication of the time that the prediction commenced.

In some example embodiments, said network node may be configured in response to said prediction means indicating that a requested prediction had commenced prior to reviving said activation request to generate a response to said other requesting network node indicating a time at which said prediction started.

In some example embodiments, said received request comprises an indication of a trigger for triggering a prediction for generating said predicted data to be performed; said network node being configured to wait for said indicated trigger to occur prior to requesting activation of said prediction means.

In some example embodiments, said trigger comprises at least one of: a time period within which said prediction should be performed; a plurality of time periods within which a plurality of said predictions should be performed; and at least one event for triggering said prediction.

In some example embodiments, said received request comprises an indication of a level of confidence that said predicted data should satisfy, said prediction means being configured to generate predicted data that is predicted to satisfy said level of confidence.

In some example embodiments, said means for transmitting is configured to transmit said requested predicted data to said other requesting network node.

In some example embodiments, said means for transmitting is configured to transmit said requested predicted data on completion of said prediction.

In some example embodiments, said means for transmitting is configured to transmit said requested predicted data periodically.

In some example embodiments, said means for transmitting is configured to transmit said requested predicted data along with a level of confidence of said predicted data.

In some example embodiments, said means for transmitting is configured to transmit a time of completion of said prediction along with said predicted data.

In some example embodiments, said network node is configured to generate a prediction failure response in response to said prediction means being unable to generate said requested predicted data.

In some example embodiments, said generated prediction failure response includes an indication of a reason for said failure.

In some example embodiments, said reason for said failure comprises one of an inability to meet requested trigger conditions or an inability to meet requested confidence levels or insufficient resource.

In some example embodiments, said means for transmitting is configured to transmit a request for said at least some of said predicted data to a further network node in response to one of: an indication in said request that at least some of said predicted data should be generated by said further network node; and said predicted data not being obtainable by said network node.

According to various, but not necessarily all, embodiments of the invention there is provided according to a second aspect a network node comprising: prediction means for predicting at least one operational parameter of said network; wherein said network node is responsive to receipt of a request for predicted data from an other network node to request activation of said prediction means to generate said predicted data.

In some example embodiments, said network node may be further configured following activation of said prediction means to generate a response to said other network node indicating a prediction has commenced.

In some example embodiments, said network node may be configured in response to said prediction means indicating that a requested prediction had commenced prior to reviving said activation request to generate a response to said other requesting network node indicating a time at which said prediction started.

In some example embodiments, said request comprises an indication of a trigger for triggering a prediction for generating said predicted data to be performed; said network node being configured to wait for said indicated trigger to occur prior to requesting activation of said prediction means.

In some example embodiments, said trigger comprises at least one of: a time period within which said prediction should be performed; a plurality of time periods within which a plurality of said predictions should be performed; and at least one event for triggering said prediction.

In some example embodiments, said request comprises an indication of a level of confidence that said predicted data should satisfy, said prediction means being configured to generate predicted data that is predicted to satisfy said level of confidence.

In some example embodiments, said network node is configured to transmit said requested predicted data to said other network node.

In some example embodiments, said network node is configured to transmit said requested predicted data on completion of said prediction.

In some example embodiments, said network node is configured to transmit said requested predicted data periodically.

In some example embodiments, said network node is configured to transmit said requested predicted data along with a level of confidence of said predicted data.

In some example embodiments, said network node is configured to transmit a time of completion of said prediction along with said predicted data.

In some example embodiments, said network node is configured to generate a prediction failure response in response to said prediction means being unable to generate said requested predicted data.

In some example embodiments, said generated prediction failure response includes an indication of a reason for said failure.

In some example embodiments, said reason for said failure comprises one of an inability to meet requested trigger conditions or an inability to meet requested confidence levels or insufficient resource.

In some example embodiments, said network node may be configured to transmit a request for said at least some of said predicted data to a further network node in response to one of: an indication in said request that at least some of said predicted data should be generated by said further network node; and said predicted data not being obtainable by said network node.

In some example embodiments, said prediction means comprises a processor configured to execute a machine learning model, said predicted data being generated by said machine learning model.

According to various, but not necessarily all, embodiments of the invention there is provided according to a third aspect a wireless communication system comprising at least one network node according to a first aspect and a plurality of network nodes according to a second aspect.

According to various, but not necessarily all, embodiments of the invention there is provided according to a fourth aspect a method comprising: generating at a network node a request requesting predicted data from at least one other network node.

In some embodiments, the method may comprise an initial step of, ascertaining data required for determining an operational parameter of network; and in response to said required data being predicted data obtainable at at least one other network node generating said request for said predicted data.

In some example embodiments, the method may further comprise transmitting said request to a further network node.

In some example embodiments, the method may further comprise receiving said predicted data; and determining an operational parameter of the network using said received predicted data.

According to various, but not necessarily all, embodiments of the invention there is provided according to a fifth aspect a method comprising: receiving a request for predicted data from an other network node; and generating said predicted data.

In some example embodiments, the method may further comprise transmitting said predicted data to a network node requesting said predicted data.

According to various, but not necessarily all, embodiments of the invention there is provided according to a sixth aspect a computer program comprising computer readable instructions which when executed by a processor are operable to control said processor to: generate a request requesting predicted data from a remote network node.

According to various, but not necessarily all, embodiments of the invention there is provided according to a seventh aspect a computer program comprising computer readable instructions which when executed by a processor are operable to control said processor to: in response to a request requesting predicted data to generate said predicted data.

In some embodiments the computer program may be further operable to control said processor to: generate a request requesting predicted data from a remote network node.

The means configured to generate a request may comprise circuitry configured to generate said request.

The prediction means for predicting may comprise prediction circuitry configured to predict.

The means for transmitting may comprise a transmitter or transmission circuitry configured to transmit, the means for receiving may comprise a receiver or receiving circuitry configured to receive.

Further particular and preferred aspects are set out in the accompanying independent and dependent claims. Features of the dependent claims may be combined with features of the independent claims as appropriate, and in combinations other than those explicitly set out in the claims.

Where an apparatus feature is described as being operable to provide a function, it will be appreciated that this includes an apparatus feature which provides that function or which is adapted or configured to provide that function.

BRIEF DESCRIPTION

Some example embodiments will now be described with reference to the accompanying drawings in which.

Figure 3:
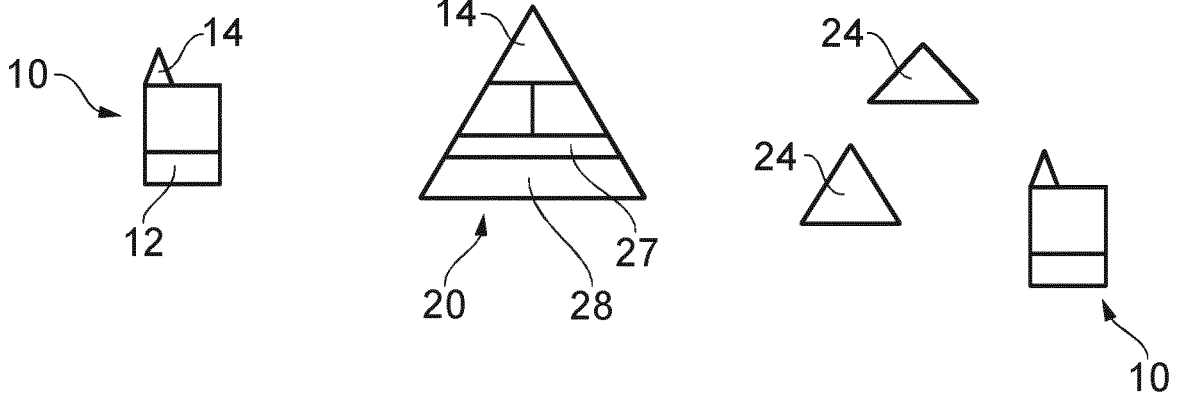

FIG. 3 schematically illustrates a network system comprising network nodes according to example embodiments; and FIGS. 4-7 schematically illustrates the transmission of signals between network nodes, requesting predicted data and responding to the requests according to example embodiments.

DETAILED DESCRIPTION

Before discussing the example embodiments in any more detail, first an overview will be provided.

Communication networks are becoming increasingly sophisticated and their performance can be improved where future operational conditions can be effectively predicted such as the number of user equipment that are to be served, the expected data rates, the nature of the data and so forth. Some of the predicted data that may be required for these often complex predictions or optimisations may only be obtainable by a different node due to the distributed nature of the communication network. Thus, example embodiments provide network nodes that are configured to request predicted data from another node and use that data in its own determinations or predictions such as predicting future scenarios of the network.

The network node of embodiments may act as both or either of the requesting and receiving entities and can be a base station sometimes referred to as a RAN node or eNB, an NG-RAN node (described in 3GPP TS 38.300) which may be either a gNB or an ng-eNB, an en-gNB (described in 3GPP TS 37.340), a network control node, a virtualized network function, an access point or a UE. In case of split architectures (cf. 3GPP TS 38.401), the sending and receiving entities or network nodes can be a gNB-CU (centralised unit) or a gNB-DU (distributed unit) (for information transfer on the F1 interface, (cf. 3GPP TS 38.473), or an ng-eNB-CU and an ng-eNB-DU (for information transfer on the W1 interface, cf. 3GPP TS 37.473)). Interfaces between these nodes including the Xn, F1, and Uu (when predicted data is requested from or requested by a user equipment) interfaces may be used for transmission of these signals.

The network node of embodiments may further include a portion of a base station or a portion of a RAN node, (e.g., such as a centralized unit (CU) and/or a distributed unit (DU) in the case of a split base station). At least a part of the functionalities of a base station (e.g., access point (AP), base station (BS) or (e)Node B (eNB), BS, RAN node) may also be carried out by any node, server or host which may be operably coupled to a transceiver, such as a remote radio head. BS (or AP) may provide wireless coverage within a cell, including to user devices (or UEs). Where the network node is a BS it may be connected to a core network via a S1 interface or NG interface. This is merely one example of a wireless network in which network nodes according to embodiments may be used. A base station is an example of a radio access network (RAN) node within a wireless network. A BS (or a RAN node) may be or may include (or may alternatively be referred to as), e.g., an access point (AP), a gNB, an eNB, or portion thereof (such as a centralized unit (CU) and/or a distributed unit (DU) in the case of a split BS or split gNB), or other network node.

According to an example of a network in which embodiments may be used, a BS node (e.g., BS, eNB, gNB, CU/DU, . . . ) or a radio access network (RAN) may be part of a mobile telecommunication system. A base station may also be DU (Distributed Unit) part of IAB (Integrated Access and Backhaul) node (a.k.a. a relay node). DU facilitates the access link connection(s) for an IAB node.

The interfaces used for transmitting signal between the network nodes of embodiments may be those provided under Third Generation Partnership Project (3GPP), next generation radio access network (NG-RAN) architecture and may include at least one Xn-C interface to interconnect next generation Nodes B (gNB) (TS 38.401). These gNBs may also interconnect using XnAP procedures, as defined in 3GPP technical specification (TS) 38.423, as well as at least one next generation (NG) interface via an intermediary fifth generation core network (5GC) 111. In some cases, a gNB node may comprise at least one gNB-centralized unit (CU) or node connected to at least one gNB-decentralized unit (DU) or node via at least one F1 interface using F1AP procedures, as defined in 3GPP TS 38.473. gNB-DUs may also be controlled and configured by at least one operation and maintenance (OAM) unit.

Example embodiments provide the ability for a network node to request one or more further network nodes to initiate a prediction, generate predicted data and transmit that predicted data to the requesting node. The requesting node may indicate in its request not only the type of predicted data that it requires but also the confidence level it requires, when the prediction should be performed and in some cases how often the prediction should be performed.

In some embodiments the complex prediction or optimisation tasks are addressed by artificial intelligence/machine learning AI/ML and require predicted information from multiple network nodes. Examples include energy saving or beamforming that require prediction of UE distribution or traffic distribution. However, the current NG-RAN (next generation radio access network) inherits the distributed architecture from LTE, based on peer-to-peer relations between the RAN nodes, and centrally determining these parameters can be problematic. Such distributed RAN architecture is designed with the aim to avoid centralized RAN nodes, which saves cost and simplifies network operation e.g. by avoiding single point of failure. Example embodiments enable interaction between prediction algorithms such as machine learning prediction algorithms and other algorithms located in distributed RAN nodes (e.g. NG-RAN nodes), where each of these algorithms are based on the use of locally available information.

For example improving energy saving: It is possible today to implement ML techniques to provide prediction information about locally served UEs (in own cell or own node), and such local algorithm in node A can therefore be used to predict the rate or number of outgoing handovers towards a given target node B. Example embodiments enable the node B to trigger such algorithm in node A and subsequently report back the predicted outcome to node B.

Embodiments allow an entity to send to another entity a Prediction Status Request message. With the Prediction Status Request message the sending entity requests from the receiving entity to report on parameters predicted at the receiving side. Those parameters are indicated in the Prediction Status Request message. The parameters to be predicted can be future values of counters or measurements internal at the receiving side node, which may be a gNB. The parameters can be alternatively expected UE measurements, for example UE locations in a future time horizon.

The request may include a confidence interval that the reported predicted parameters should satisfy, namely the predicted parameters should be within a certain accuracy. In addition to the confidence interval a proportion can be included to indicate the proportion of the population contributing to a prediction satisfying the confidence interval (e.g., predictions of at least 90% of the UEs satisfy 95% confidence in the predicted number of successful handovers). Also, in addition to the above a deadline may also be included to set a timeframe within which the prediction needs to take place.

Predicted values may be requested from different entities within the receiving entity or communicating with it, e.g., from the gNB-CU, gNB-DU, or from a UE connected to the NG-RAN node.

In case the entity from which values are requested is not in direct communication with the entity in which predicted information is obtainable then the receiving entity forwards the prediction request to the entity where predicted information can be obtained. E.g., this can be the case if the prediction request involves predictions of values inside a gNB-DU or a UE, then an NG-RAN node could send the request to its neighbour which subsequently forwards the request to the corresponding gNB-DU or UE connected to it. Selecting the UE to forward the prediction request may be done by identifying the UE through an identifier, e.g., available in the RAN. Alternatively, one or more UEs may be identified through location criteria, e.g., UEs residing in a certain cell or set of cells or meeting certain radio conditions, etc.

The message may include a time when the prediction of the parameters should start. The time may be explicitly indicated (e.g., time t), implicitly indicated (e.g., upon reception of the Prediction Status Request message), or event based (e.g, when a gNB(gNB-CU) experiences more than a threshold number of handover failures).

As a further option it may be indicated that the values can be predicted with a given period every x number of time units or that the prediction should be one-time prediction.

The receiving entity responds with a Prediction Status Response message in which it indicates acknowledgement of the starting of the requested prediction. The receiving entity sends a Prediction Status Update message which includes the requested predictions in the message.

If prediction is expected to start upon reception of the Prediction Status Request message then the Prediction Status Response acknowledges the immediate beginning of the prediction. Otherwise, it confirms the beginning of the prediction either according to the indicated event or at the given time.

Since various entities (e.g., NG-RAN neighbours) may request prediction of the same quantity, it is possible that the prediction is already initiated at a given entity. In this case the receiving entity indicates this information in the Prediction Status Response message along with a timestamp information about when the prediction started in the past.

The receiving entity of a Prediction Status Request message sends a Prediction Status Update message to include the requested predictions in the message once they have been determined.

The receiving entity may include the confidence information (if such was requested) as well as the proportion of the population participating in the prediction and meeting the confidence level. In addition, the receiving entity may include the time when prediction completed. This time will be less than or equal to the indicated deadline in the Prediction Status Request message.

In the absence of confidence information, the receiving entity may include in the response best-effort predictions of the requested parameters within the deadline. If a deadline is not included in the request then the receiving entity will calculate its predictions and send them to the requesting node when it determines appropriate.

The Prediction Status Update message may be sent: periodically with a certain period signalled in the Prediction Status Request message; or once when the prediction process completes and prediction information is available.

The receiving entity may send a Prediction Status Failure message if it cannot predict the requested parameters with the given confidence level and within the requested deadline. It can additionally return a reason why it cannot start the requested prediction.

Figure 1:
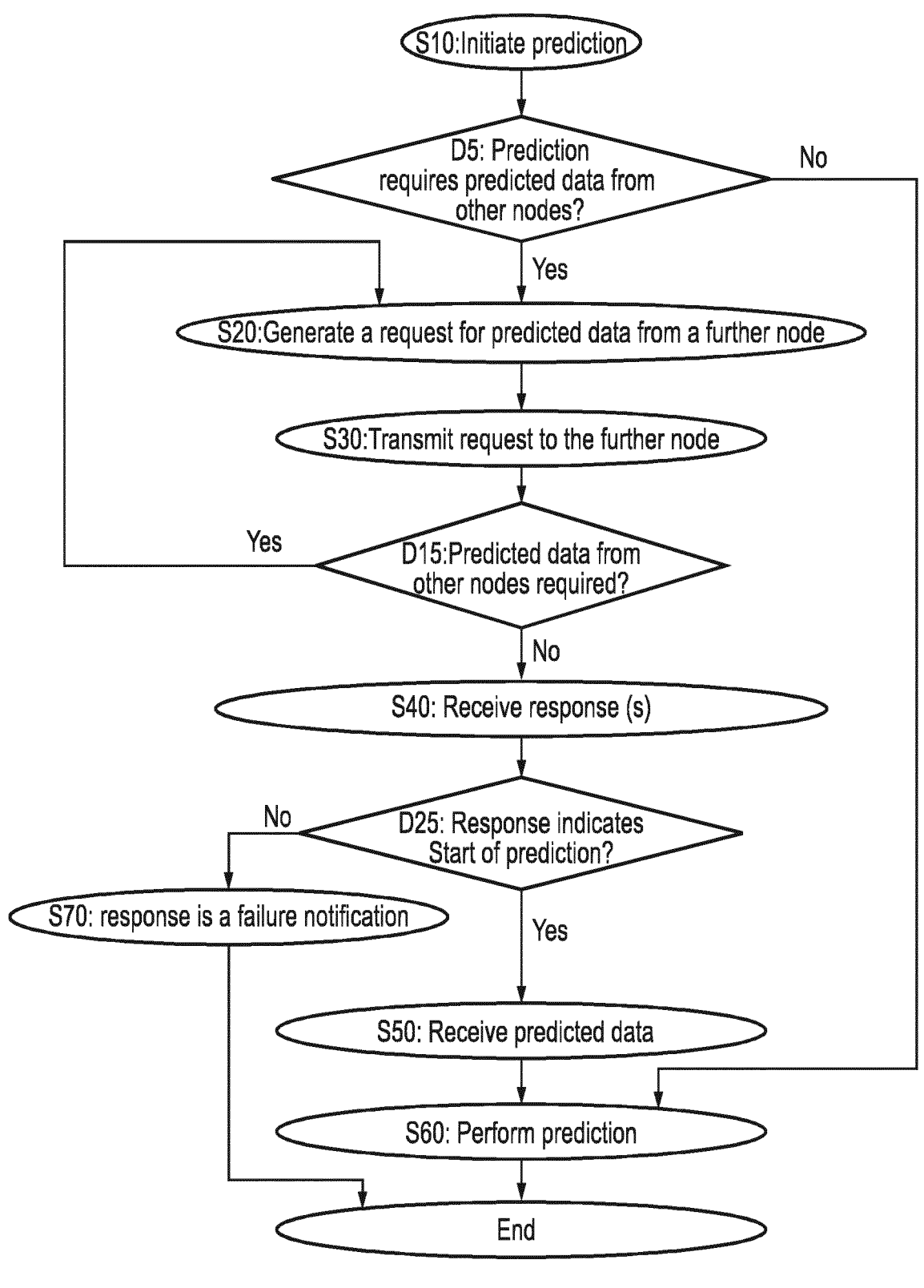
FIG. 1 illustrates a flow chart schematically illustrating steps of a method of an example embodiment.

FIG. 1 shows schematically a flow diagram illustrating steps performed in a method according to an embodiment. The method is performed at a network node which seeks to perform a prediction of some operational parameters within the network. In this example, the prediction is initiated at step S10, and at step D5 it is determined whether the method prediction requires predicted data from other nodes. If it does not then prediction is performed at step S60. If it does then a request for this predicted data from one further node is generated at step S20 and is transmitted to an other node at step S30. The other node may be the further node, or it may be an intermediary node that allows access to the further node.

It is then determined whether data from other nodes is required at step D15 and if so further requests are sent to other nodes. It is then determined at step D25 whether a response indicating a start of prediction at the other nodes is received. If prediction has started, a response is received at step S40 acknowledging the request and indicating when the prediction has started. If prediction cannot start for some reason then the response received at steps S40 is a failure notification indicating no prediction can be performed and in some embodiments providing details of why this is the case. The reason may be that particular confidence levels can not be met or perhaps the node has no spare resources for a prediction at this point in time, or it cannot complete the requested prediction in the time frame indicated. If this is the case the method then proceeds via step S70 to end the process as shown. In other embodiments receipt of a failure response may not end the method but rather delay it and the method restarts after a predetermined time by transmitting the request(s) again.

Where the response at step S40 is an acknowledgment indicating that the prediction has started the method proceeds to step S50 where predicted data is received. Once all the requested data has been received the prediction can be performed at step S60.

In this way, one node can perform predictions using data predicted by other nodes and requested and received from them. The request may be a request to generate the predicted data and may initiate the start of a prediction process.

Figure 2:
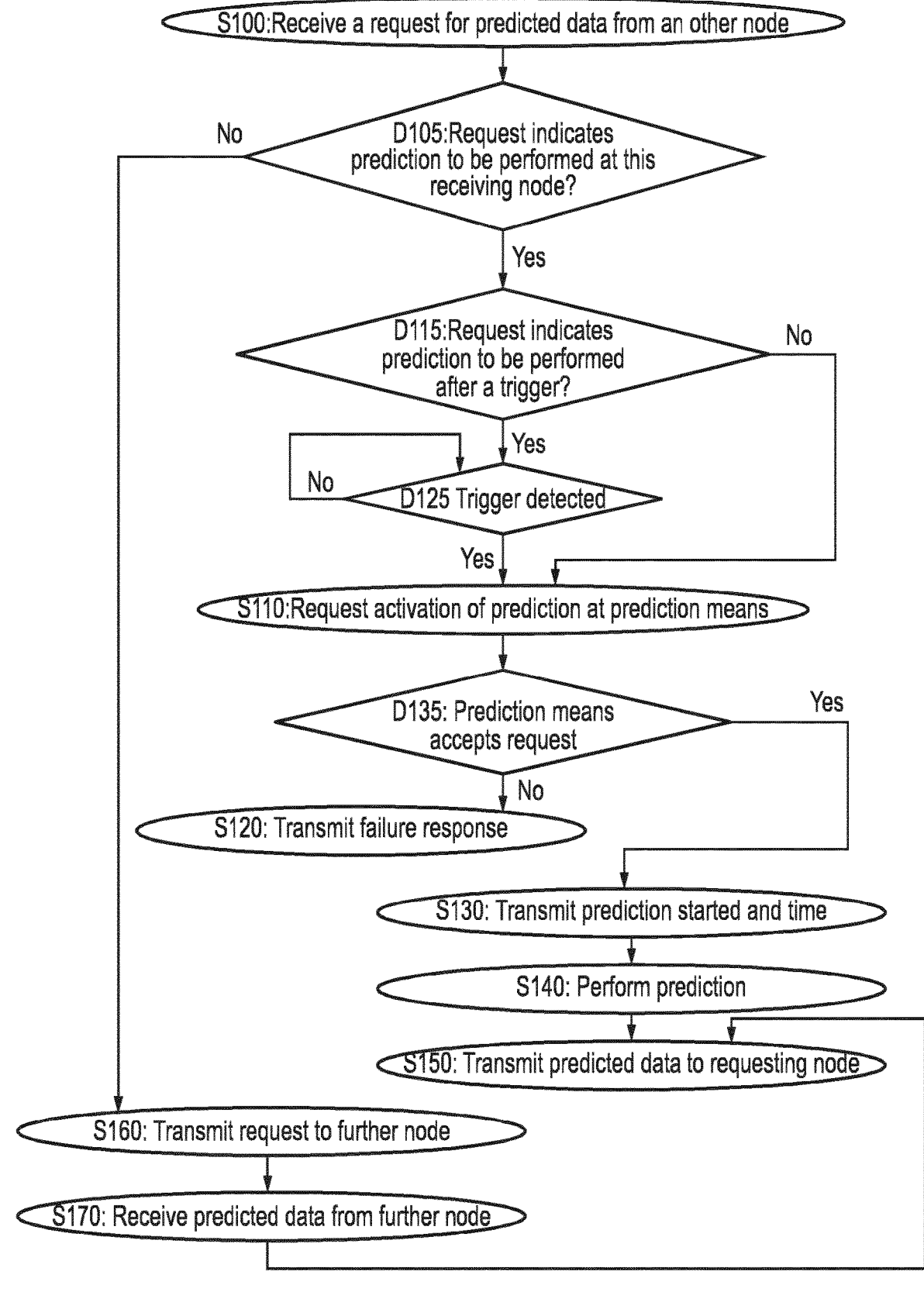
FIG. 2 illustrates a flow chart schematically illustrating steps of a method of an example embodiment.

FIG. 2 shows a flow diagram illustrating steps performed at the network node that receives the request. This network node may be user equipment, it may be a gNB or some other network node, or it may be a base station. It should be noted that some network nodes are configured to both receive and respond to predicted data requests and to generate requests for predicted data to transmit to other nodes.

Thus, this node receives a request for predicted data from an other node at step S100 and it determines at step D105 whether the request indicates the prediction is to be performed at this receiving node. This may be determined from the request itself which may indicate the node performing the prediction, or it may be determined implicitly from the predicted data requested and its knowledge of its own and other node's capabilities.

If it is not to be performed at the receiving node then the receiving node forwards the request to one or more further nodes at step S160. The one or more further nodes will obtain or generate the predicted data and where there are several nodes, one node may combine the data and return it to the node that received the original request. This node receives the predicted data (assuming no prediction failure) at step S170 and transmits it to the requesting node at step S150. If at least one further node fails to generate the predicted the data, then the node combining the data will only combine the available predictions. If rather than the predicted data a failure response is received at step S170, then it is this that is transmitted to the requesting node, that is the other node of step S100.

If the prediction is to be performed at the receiving node, the node then determines whether there is a trigger required to trigger the prediction at step D125. If there is not then the prediction is commenced immediately by requesting activation of the predication at step S110. While if a trigger is indicated as being required then the system waits at step D125 until the trigger is detected and only on detection of the trigger is a request for activation of prediction at the prediction means sent at step S110.

The prediction means may not accept the request for prediction in that it may not currently have the capacity, or it may not be able to perform a prediction at the times requested or to the confidence levels requested and it will determine this at step D135 and if this is the case it will generate and transmit a failure response back to the receiving node.

If however it can perform the prediction it will transmit an indicator that the prediction has started at step S130 along with the time and it will perform the prediction at step S140. Once the prediction is completed it will transmit the predicted data to the requesting node at step S150.

FIG. 3 schematically shows a wireless communication network having a plurality of network nodes according to embodiments. The network nodes include a user equipment 10 having a transmitter/receiver 14 and prediction circuity 12 for generating predicted data. This circuitry may be machine learning circuitry that may use artificial intelligence to optimise or at least improve its predictions.

A further network node comprises a base station 20 comprising processing circuitry 28 that includes prediction algorithms and determining or optimising algorithms both of which may use predicted data received from other nodes within the network. Base station 20 also has a transmitter/receiver 14 for communicating wirelessly with other nodes such as user equipment and gNB's within its cell. There is also a wired connection (not shown) to other base stations and to a central network control node. Base station 20 also comprises, in this embodiment, request generating means or circuitry 27 configured to generate requests for predicted data from other nodes where it deems these are required either when performing predictions or when performing some other task for determining network parameters, such as setting thresholds to optimise handovers or setting beamforming values, which may require an estimate of where user equipment are likely to be and their expected data traffic. This predicted data may not be data that it is able to determine itself and thus, the base station 20 may generate a request using request generating circuitry 27 which request may then be sent to one or more of the other network nodes within the network via transmitter/receiver 14. The request may also be sent to other nodes within the network via a wired backhaul link.

The node receiving the request and able to perform the prediction will generate the predicted data and send it back to base station 20 which may then perform the determination that this predicted data is required for. Where the network node receiving the request is unable to generate the predicted data, it may forward the request to a further network node that it deems is able to obtain the data or it may send a failure response.

The network nodes that receive the requests and indeed that may themselves generate requests include in addition to the UE 10, gNB nodes 24, that may be centralised or distributed units.

FIGS. 4 to 7 shows an example of the proposed new messages that include prediction status request 200, prediction status response 220, prediction status update 230 and prediction status failure 240 messages being sent between two NG-RAN nodes 20 over the $X_n$ interface. Alternatively, these messages may be sent between a gNB-CU and gNB-DU over the F1 interface or between a ng-eNB-CU and an ng-eNB-DU over W1 interface. They can further be sent between a NG-RAN node (gNB-CU or ng-eNB-CU) and a UE.

Figure 4:
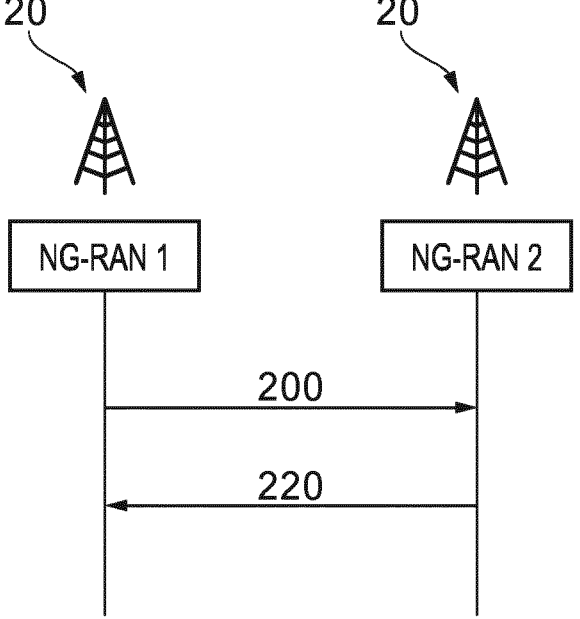

FIG. 4 shows the transmission of a prediction status request 200 from in this example base station 20 to another base station 20. The prediction status request 200 requests predicted data in this case a report on data predicted at the receiving side. The data may be indicated in the Prediction Status Request message 200. The data to be predicted can be future values of counters or other measurements internal at the gNB, e.g., data indicating throughput quantities, delay measurements, signal strength measurements, number of active RRC Connections, cell load, cell available capacity, etc., corresponding to future time instants. A list of possible counters held at a gNB, gNB-CU or gNB-DU is included in TS 28.552 but it should be understood that the possible counters and measurements to be predicted are not be limited to those described there. The data can alternatively be expected UE measurements, for example UE locations in a future time horizon, expected signal strength values (RSRP/RSRQ/SINR) of a UE in the future, expected number of handovers, expected cells that it will connect to, etc. As one example UE measurements can be predictions of UE MDT measurements (MDT measurements are defined in TS 37.320). The message may include parameters related to the predictions which may include a level of confidence, a time deadline within which the predicted data is required, an indication of the entity or entities involved in the prediction and a prediction triggering condition which may be explicit such as a time, for instance a prediction should be triggered at time t, or it may be implicit that is event based, for instance a prediction should be triggered if a certain event happens (or does not happen). There may also be an indication as to whether the trigger is a once only trigger or whether it is one that periodically repeats.

A prediction status response 220 is sent from the receiving node 20 and is an acknowledgement that the prediction status request has been received and may include a prediction indicator indicating the status of the prediction, that is whether it is ongoing and its start time, or if it has not yet started, the time that it will start or the event that will trigger it to start.

Figures 5, 6:
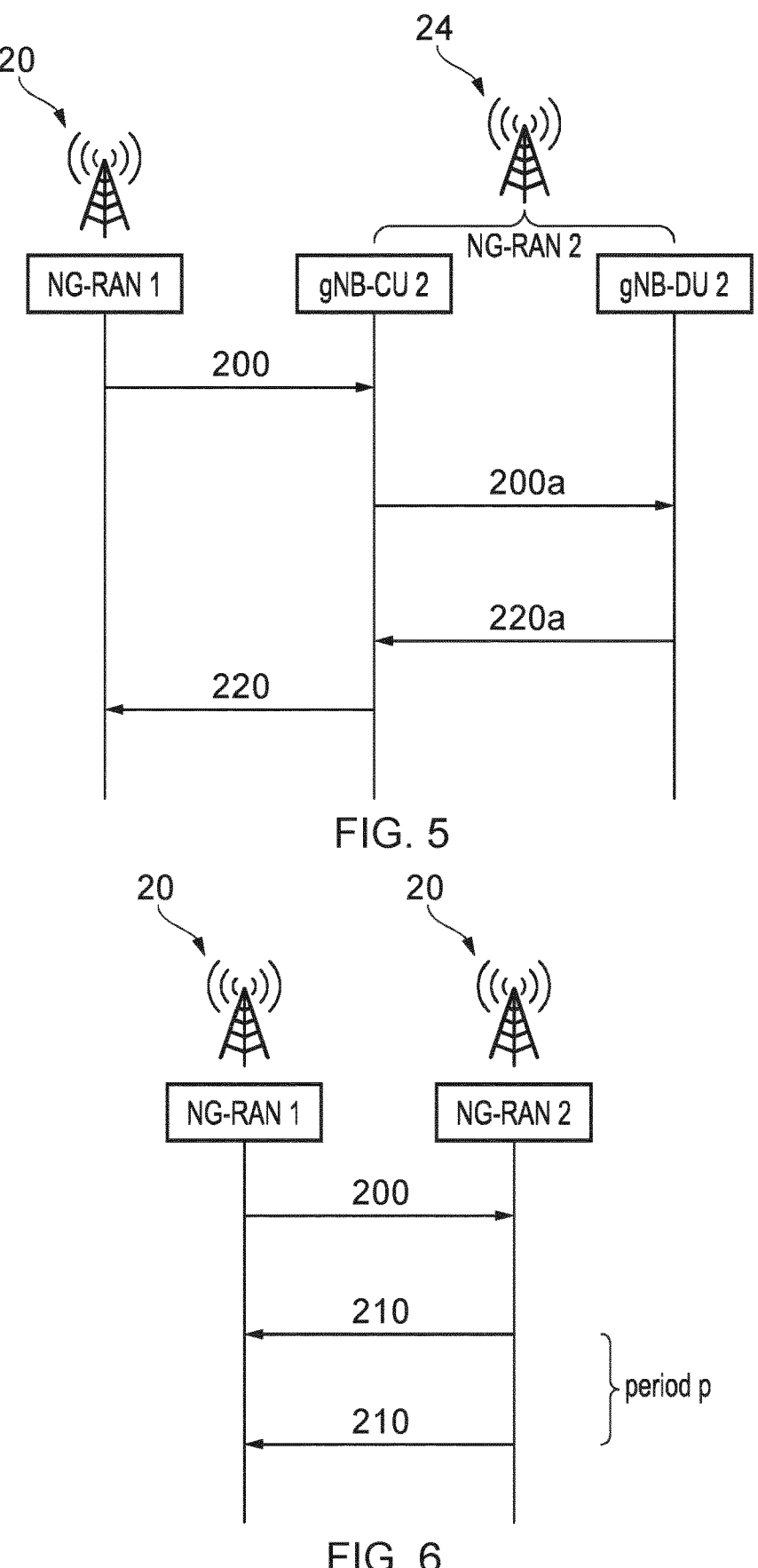

FIG. 5 shows an example of messages being sent between a base station or NG-RAN node 20 as well as a gNB-CU and a gNB-DU 24 (over both Xn and F1 interfaces in case of split architectures). FIG. 5 shows the forwarding of the prediction status request message 200a from the receiving node 24 to a responsible node that is not connected with the base station 20 through an interface. In this example network node 24 comprises a gNB-CU which is the centralised unit and a gNB-DU which is a distributed unit. The centralised unit receives the prediction status request 200 and determines the distributed unit that it believes would be able to respond and transmits the predictions status request 200a with the parameters to the distributed unit. The centralised unit determines the distributed unit(s) to transmit the request to either from information included in the original message 200 identifying the distributed units through an identifier, or from performance information it has of the different distributed units. In this regard it may select the DUs based on which are the best DUs to provide the counters or measurements with the requested confidence and within the specified deadline, or simply the DUs that are capable of performing the requested predictions and which are not currently overloaded.

The distributed unit then responds to the centralised unit with a prediction status response 220a indicating either that it is ongoing and when it started or that it is to be started at a certain time or in response to a certain event. The centralised unit of node 24 then responds by transmitting the prediction status response 220 to the requesting base station 20.

In this example the node 24 is a gNB and the message can be sent over F1 interface in case of split architectures between a gNB-DU and a gNB-CU. Additionally, the message can be sent over Uu interface if predictions were requested from a UE.

FIG. 6 shows an example of a prediction of status update message 210 sent as a response to a prediction status request message 200. In this example the response is sent periodically with period p. Thus, as in FIG. 4 the prediction status request 200 is sent from network node 20 to the receiving network node 20 and in this case the request indicates that it requires prediction data every period p. Receiving node 20 responds with a prediction status update 210 with the required parameters and then after a period p responds again with a subsequent prediction status update 210 with updated predicted data.

Figure 7:
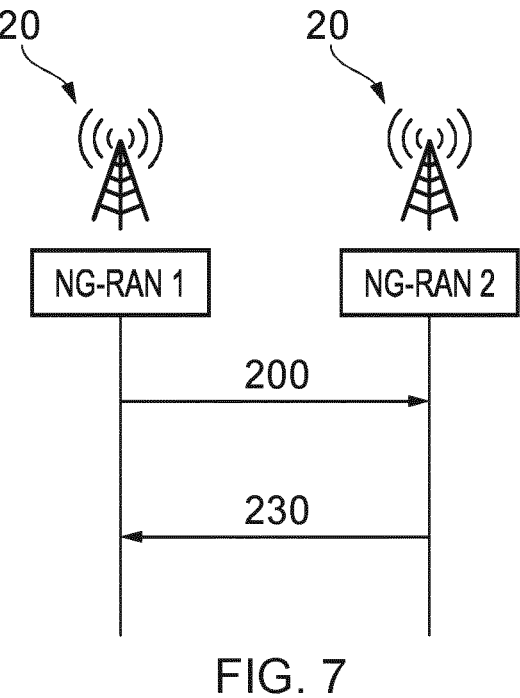

FIG. 7 shows a further example of two NG-RAN nodes 20 and in this example prediction status failure occurs. The prediction status request message 200 is sent and the receiving node 20 recognises that it cannot provide the predicted data, either to required confidence levels, within the required timeframe, or at all and responds with a prediction status failure response 230. This may include the reasons why it can't provide the predicted data, for example "confidence level cannot be met". As above the message can be sent over the F1 interface in case of split architectures between a gNB-DU and a gNB-CU or over Uu if predictions were requested from a UE.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A network node, comprising:

at least one processor; and at least one memory storing instructions that, when executed by the at least one processor, cause the network node at least to perform:

receiving a request, from another network node, for predicted data, the request requesting activation of predicting at least one operational parameter of the network node, wherein the request comprises an indication of a trigger for triggering a prediction for generating the predicted data to be performed, the network node being caused to wait for the indicated trigger to occur prior to activating the predicting, wherein the trigger comprises:

a time period within which the predicting should be performed, a plurality of time periods within which a plurality of predictions should be performed, at least one event for triggering the predicting, and an indication of a periodically repeating trigger;

activating the predicting;

following the activating of the predicting, generating a response to the another network node indicating the predicting has commenced, the response including an indication of a time at which the predicting started;

receiving a prediction status request message indicating that prediction data is required every period p;

transmitting, at every period p, a prediction status update message; and transmitting a prediction failure response in response to the predicting being unable to generate the requested predicted data, wherein the prediction failure response includes an indication of a reason for failure, the reason for failure being insufficient resource.

* * * * *